J. POTTER.
LEATHER-CUTTING GAGE.
No. 7,796. Reissued July 17, 1877
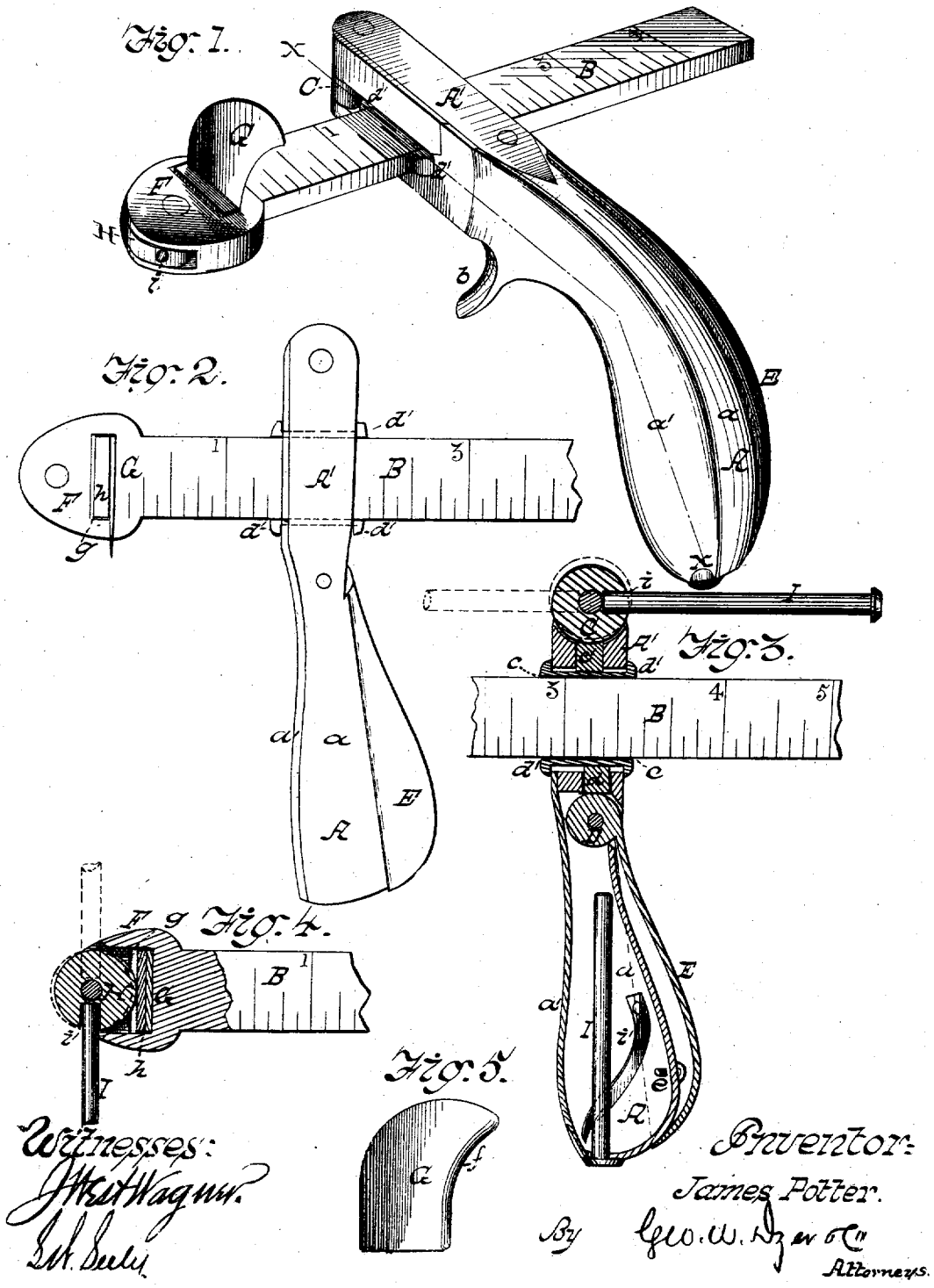
N. PETERS, PHOTO-LITHOGRAPHER, WASHINGTON, D. C.

UNITED STATES PATENT OFFICE.

JAMES POTTER, OF CHICAGO, ILLINOIS.

IMPROVEMENT IN LEATHER-CUTTING GAGES.

Specification forming part of Letters Patent No. 180,633, dated August 1, 1876; Reissue No. 7,796, dated July 17, 1877; application filed May 26, 1877.

*To all whom it may concern:*

Be it known that I, JAMES POTTER, of Chicago, in the county of Cook and State of Illinois, have invented a new and useful Improvement in Gages for Cutting Leather; and I do hereby declare that the following is a full, clear, and exact description of the same.

The object I have in view is to produce a draw-gage for cutting leather, in which the gage-bar will be held rigidly in place, but can be readily and conveniently loosened for adjustment, and at the same time to provide the draw-gage with a handle which will be cheaper and more durable than heretofore, and will be adapted for adjustment to suit the hand of the operator.

My invention therein consists, first, in the means for holding the gage-bar and admitting of its ready adjustment; second, in the peculiar hollow cast-metal handle; third, in the means for adjusting the size of the handle; and, fourth, in the spring in the hollow handle for retaining the lever by which the cams are actuated, all as more fully hereinafter explained.

To enable others skilled in the art to make and use my improvement, I proceed to describe the same, having reference to the accompanying drawings, in which—

Figure 1 is a perspective view of the tool complete; Fig. 2, a top view of the same; Fig. 3, a central horizontal section on the line *x x* in Fig. 1; Fig. 4, a central horizontal section through the head of the gage-bar, and Fig. 5 a separate view of the knife-blade.

Like letters denote corresponding parts in each figure.

A represents the handle of the tool extended to form a head, A′. This handle is preferably cast from any proper metal in two parts, *a a′*, which are secured together by rivets, so as to form a hollow handle, which is light, cheap, and durable. As will be seen, the handle A is of peculiar shape, resembling somewhat the stock of a pistol, the part *a* (the outer side of the handle) being bulged out, as shown, to fit the palm of the hand. The inner side *a′* is more flat in form, and is thrown out of line with the head A′ of the tool, so as to keep the hand of the operator out of the way of the leather being cut. A curved finger-hook, *b*, is cast on the under side of the handle to give a better gripe.

B is the gage-bar, which slides in a slot, *c*, in the head A′ and has suitable graduations cut in its face. The gage-bar is held in the head, and adjusted to any desired point by the following means: In the end of head A′ is pivoted a cam, C, which bears against a pin, *c′*, projecting into the slot *c*. D is another cam, placed in the end of the handle on the opposite side of the slot from the cam C. This cam D bears against a pin, *d*, projecting into the slot *c* opposite to the pin *c′*. A lever, E, is attached to the cam D for turning the same, and extends over the side *a* of the handle, being of the same convexity as that side of the handle. This lever is grasped by the hand when the tool is operated, and the cam D forces the pin *d* into the slot. The pins *c′* and *d* may press directly upon the gage-bar, or suitable gibs, *d′*, may be placed in the slot *c* to receive the pressure from the pins, and transmit the same to the gage-bar. The lever E also serves the purpose of adjusting the size of the handle, so that one size only of the tool will have to be made to fit a large or a small size hand. This adjustment is effected by means of a screw, *e*, tapped into the handle under the lever.

The head F of the gage-bar is enlarged, and in it is removably secured the cutting-knife G. This knife is constructed, as shown in Fig. 5, with a cutting-edge, *f*, inclined forward, so that the leather in being cut will be drawn down to the gage. By making a drawing cut the knife can be operated easier. The shank of the knife is placed in a slot, *g*, in the head F, and a cam, H, similar to the cam C, presses against the knife or an intervening gib, *h*. Each of the cams C and H is provided with a hole, *i*, into which a lever, I, is entered for turning such cams. This lever I, when not in use, is pushed into a hole in the end of the hollow handle, and is prevented from falling out of the same by a leaf-spring, *i′*, secured within the handle.

To adjust the gage-bar in the head A′, the cams C and D are moved, or either of them, but this is more conveniently accomplished by having the cam C so turned, that when the lever E is closed on the handle or adjusting-screw, the gage-bar will be rigidly held, and by moving the lever a short distance, the gage-bar will be released sufficiently to allow of its adjustment. The knife can be readily removed from the head of the gage-bar for sharpening, by turning the cam H.

The advantages of my device lie principally in the cheapness and lightness of the handle, and its adaptability for adjustment to various sizes, in the ease and convenience with which the gage-bar can be adjusted, and the general efficiency of the tool.

Having thus fully described my draw-gage, and explained some of its advantages, what I claim as new therein, and desire to secure by Letters Patent, is—

1. In a draw-gage for cutting leather, the combination, with the sliding gage-bar, of a cam actuated by a lever, for the purpose of holding the said bar at any point, substantially as described.

2. The combination, with the sliding gage-bar, of a cam bearing upon one side of the same, and another cam, actuated by a lever, bearing against the other side of the said bar, substantially as described and shown.

3. In a draw-gage for cutting leather, the handle A cast hollow, and having the finger-hook *b* cast therewith, substantially as described and shown.

4. In a draw-gage for cutting leather, the hollow cast-metal handle A, turned down like a pistol-stock, and having its inner side thrown out of line with the head of the instrument, substantially as and for the purposes set forth.

5. In a draw-gage for cutting leather, the metal handle A, cast hollow in two parts, *a a'*, and having the finger-hook *b*, substantially as described and shown.

6. The combination, with the handle A, of the adjustable lever E, for the purpose of changing the size of the said handle, substantially as described and shown.

7. In a draw-gage for cutting leather, the hollow handle, having a leaf-spring secured therein, and a hole for the entrance of the lever for working the cams, substantially as described and shown.

JAMES POTTER.

Witnesses:
HENRY S. DATE,
CHAS. A. IGLEHART.